US012709023B2

(12) United States Patent
Enenkel

(10) Patent No.: US 12,709,023 B2
(45) Date of Patent: Aug. 18, 2026

(54) DEVICE FOR TAKING HOLD OF AND RELEASING AN OBJECT

(71) Applicant: KÖRBER SUPPLY CHAIN LOGISTICS GMBH, Constance (DE)

(72) Inventor: Peter Enenkel, Constance (DE)

(73) Assignee: KÖRBER SUPPLY CHAIN LOGISTICS GMBH, Constance (DE)

( * ) Notice: Subject to any disclaimer, the term of this patent is extended or adjusted under 35 U.S.C. 154(b) by 996 days.

(21) Appl. No.: 17/907,772

(22) PCT Filed: Feb. 8, 2021

(86) PCT No.: PCT/EP2021/052915
§ 371 (c)(1),
(2) Date: Aug. 29, 2022

(87) PCT Pub. No.: WO2021/170383
PCT Pub. Date: Sep. 2, 2021

(65) Prior Publication Data

US 2023/0116557 A1 Apr. 13, 2023

(30) Foreign Application Priority Data

Feb. 27, 2020 (EP) .................................... 20159701

(51) Int. Cl.
*B25J 15/06* (2006.01)
*B25J 19/02* (2006.01)

(52) U.S. Cl.
CPC ....... *B25J 15/0633* (2013.01); *B25J 15/0683* (2013.01); *B25J 19/023* (2013.01)

(58) Field of Classification Search
None
See application file for complete search history.

(56) References Cited

U.S. PATENT DOCUMENTS 12,202,128 B1 * 1/2025 Colantonio .......... B25J 15/0683
2005/0226711 A1 * 10/2005 Schnoor ............... B25J 15/0616
414/736

(Continued)

FOREIGN PATENT DOCUMENTS

DE 4444960 A1 6/1996
EP 1369364 A1 12/2003

(Continued)

*Primary Examiner* — Steven M Marsh
(74) *Attorney, Agent, or Firm* — Price Heneveld LLP

(57) ABSTRACT

An apparatus for taking hold of and releasing an object, which may be surrounded by a packaging with no surface stiffness and/or be positionally unstable in some circumstances. The apparatus includes: a manually and/or machine-controlled arm which can be actively directed to the object; a suction opening arranged at the freely moving end of the arm; a suction device for providing a negative pressure required at the suction opening; and a controllable vacuum check valve at the suction opening for adjusting the negative pressure acting on the object. The device makes it possible, using suction, to securely take hold of and then correspondingly further transport objects that are difficult due to their surface properties, e.g., items to be sorted with an inhomogeneous shape and/or a porous surface and/or items to be sorted that are packed, for instance, in plastic bags.

17 Claims, 2 Drawing Sheets

(56) References Cited

U.S. PATENT DOCUMENTS

| | | | | |
|---|---|---|---|---|
| 2008/0202602 | A1* | 8/2008 | Flaim | B25J 15/0052 137/488 |
| 2009/0097953 | A1* | 4/2009 | Brugger | B65G 47/91 414/752.1 |
| 2014/0241846 | A1 | 8/2014 | Mohd Zairi | |
| 2017/0073174 | A1 | 3/2017 | Tanaka et al. | |
| 2017/0253438 | A1 | 9/2017 | Tanaka et al. | |
| 2018/0333866 | A1 | 11/2018 | Wagner et al. | |
| 2018/0369996 | A1 | 12/2018 | Meyer et al. | |
| 2019/0344453 | A1* | 11/2019 | Harter | B25J 15/0408 |
| 2020/0269429 | A1* | 8/2020 | Chavez | B25J 11/0045 |
| 2021/0053216 | A1* | 2/2021 | Diankov | B25J 9/1669 |
| 2021/0053230 | A1* | 2/2021 | Mizoguchi | B25J 9/1687 |
| 2021/0069904 | A1* | 3/2021 | Duan | B25J 9/161 |
| 2021/0213629 | A1* | 7/2021 | Frey | B25J 15/0625 |
| 2022/0331989 | A1* | 10/2022 | Moreno | B05B 7/0018 |
| 2022/0395987 | A1* | 12/2022 | Hvass | B25J 17/0225 |
| 2023/0158677 | A1* | 5/2023 | Tsutsui | B65G 57/03 700/246 |
| 2024/0139973 | A1* | 5/2024 | Oka | B25J 15/10 |

FOREIGN PATENT DOCUMENTS

| | | | |
|---|---|---|---|
| FR | 3075084 | A1 | 6/2019 |
| JP | H04201087 | A | 7/1992 |
| JP | H07111816 | A | 5/1995 |
| JP | 2017019100 | A | 1/2017 |
| JP | 6275910 | B1 | 2/2018 |
| JP | 2019059571 | A | 4/2019 |

* cited by examiner

DEVICE FOR TAKING HOLD OF AND RELEASING AN OBJECT

FIELD AND BACKGROUND OF THE INVENTION

The invention relates to an apparatus for taking hold of and releasing an object, which in some circumstances may also have an unstable position and/or be surrounded by packaging without a rigid surface.

Large logistics centers with baggage, mail and/or package sorting installations, in which baggage items, letters and/or large letters and/or packages are processed, are operated for example by the company Siemens Logistics GmbH.

In these kinds of logistics centers, baggage items, letters, packages or consignments (referred to as sorting items in the following) are separated from an inventory, for example a stack, at a separating apparatus (material input), transported by a conveying system along a conveying path and are supplied, at multiple sorting outputs, for example realized by sorting diverters or crossbelt sorters or tilting apparatuses, to the respective destination points, such as destination points of a baggage sorting installation in an airport, for example. During the transport or sorting process, the sorting items are sorted into the destination points. For the sorting process, each destination point is in each case assigned a variable destination code according to the sorting logic or according to the sorting process by means of a sorting/transport controller. The sorting items are also assigned a variable destination code, according to which they are then sorted into a destination point. Multiple destination points may also have the same destination code, for example in the case of destination addresses that are known to have high consignment volumes. This is useful, for example, if there is insufficient capacity at a destination point to receive all sorting items for this destination code.

With the heavy volumes of small item consignments, for which annual growth rates of more than 20% are predicted for the coming years, on the one hand the number of sorting items to be processed is increasing massively, while on the other hand the packaging of these small item consignments, which very often is not homogeneous, is making the sorting of these sorting items, which are generally referred to as positionally unstable, significantly more challenging compared to a conventional cuboidal package or parcel. For these small item consignments, which substantially originate from B2C e-commerce and have extremely heterogeneous and positionally unstable packaging, the future proportion of the overall cargo volumes is estimated to be more than 50%.

Furthermore, as part of the automation of the sorting processes, the aim is to fully automate the process according to the keyword "one touch" at as many terminal points as possible. To this end, it is crucial that sorting items with an especially unstable position can be grasped effectively at a point in the sorting procedure and also can be released again at another point in the sorting procedure.

These requirements mentioned above for the handling of sorting items may also, however, generally apply to any kind of object which has to be moved from one point to another point, as may also occur in industrial manufacturing and automation systems, for example. The case of sorting items explained in more detail above thus in fact only represents one specific application case of an industrial automation system.

To pick up an object, in particular a sorting item, currently there already exist some solutions, which however are not satisfactory especially in relation to sorting items with unstable positions and sorting items with inhomogeneous structure and/or deformable packaging.

SUMMARY OF THE INVENTION

The object underlying the present invention is therefore to specify an apparatus for taking hold of and releasing an object, which in some circumstances may also have an unstable position and/or be surrounded by packaging without a rigid surface, which is characterized by a simple construction and a rapid process speed and, in this context, allows the object to be reliably moved from one location to another location.

According to the invention, this object is achieved by an apparatus for taking hold of and releasing an object, which in some circumstances may also have an unstable position and/or be surrounded by packaging without a rigid surface, comprising:

a) an arm controlled manually and/or by machine, which can be actively led to the object, b) a suction opening arranged at the freely movable end of the arm for suction of the object;

c) a suction apparatus for providing a vacuum necessary at the suction opening for taking hold of the object; and d) a controllable vacuum switching valve arranged at the suction opening for setting the vacuum from the suction apparatus taking effect on the object.

In this manner, with this apparatus it is possible to also be able to "grasp" objects which are difficult in terms of their surface condition, such as sorting items with an inhomogeneous shape and/or a porous surface and/or sorting items packed into plastic bags etc., for example, in a safe manner by way of the suction. In the wording of the claims, the expression "taking hold of" has been used here in an entirely general manner, because in the true sense of the expression the suction is not actually a gripping or grasping of the object, but in principle can of course be understood as such. It should also be noted that the term "get hold of something" is an equally valid expression for taking hold of an object. Through the arrangement of the vacuum valve at the suction opening, when the arm and therefore the outlet opening have approached the object to a sufficient extent, there is also such a close spatial proximity to the object to be suctioned that only a comparatively low volume has to be evacuated before the object is docked at the suction opening. Thus, the object can be secured at the suction opening by way of the vacuum taking effect on the object or the packaging thereof in a very rapid manner, whereby very brief cycle times may be produced for the movement of the object from a first position to a second position and thus comparatively high accelerations of the object are also permitted to be performed. Accordingly, the position of the vacuum valve can then also be adjusted in an adaptive manner, such that only the vacuum that is necessary to secure the object that has been suctioned at one point takes effect on the object, meaning that also in this manner pressure-sensitive objects and/or outer packaging can be secured safely and without damage. As the vacuum decays, for example due to the corresponding setting of the vacuum valve and/or the reduction of the suction power, the object secured at the suction opening may then also be released again and deposited on a sorting conveyor or a feed apparatus or a simple conveyor belt or the like, for example.

In order to be able to advantageously simplify the suction of objects with shapeless bag-like packaging, for example, the suction opening may be embodied as a suction cup with a rib-like shape on the object side. This suction cup is therefore also able to adapt to the shape and/or the condition of the surface, which has a positive effect on the mechanical positive fit between the contracting ribs and the object. In the case of bag-like packaging, it is therefore possible for some of the packaging to be drawn into the suction cup forming a bellows, whereby the ribs of the bellows are also able to "embrace" packaging with a flexible surface especially well. Thus, even in the case of bag-like packaging, objects held in this manner are able to be subjected to relatively large accelerations, which thus again has a positive effect on the process duration.

In this context it is expedient if, in a further embodiment of the invention, the ribs of the suction cup are designed, with regard to their deformability, for a bandwidth of anticipated surface inhomogeneities of the object and/or for a bandwidth of anticipated weights of the object.

In order to also be able to tolerate comparatively high leakage airflows during suction of the object, in an advantageous development of the invention it may be provided that the suction apparatus is designed, with regard to its suction power, for a bandwidth of anticipated surface inhomogeneities of the object and/or for a bandwidth of the anticipated weight of the object.

In this context, it is possible to take into consideration, for example, that in the event of crumpled, wrinkled, cracked, bent and/or porous objects, leakage airflows of this kind may occur, which have to be overcompensated by a corresponding suction power. In addition to providing the necessary suction power by way of the suction apparatus, the vacuum valve also has to be shaped in terms of its construction such that sufficiently high vacuum airflows can be switched on and can also be switched back again with high dynamics.

It may further be provided that the suction apparatus is also arranged immediately at the suction opening, and is preferably carried by the arm. This also results in only a low volume to be evacuated between the actual suction apparatus and the vacuum valve.

In a further advantageous embodiment of the invention, the arm may be embodied as a robot arm, the control of which preferably can be associated with optical detection means for controlling the movement of the suction opening toward the object. Thus, arranged at the suction opening there may be a camera, for example, which uses corresponding image processing software to identify the object to be suctioned and as a result is capable of automatically controlling the robot arm so close to the object that it enters the field of influence of the suction airflow and is thus suctioned at the suction opening and then can also be held for the purpose of displacement.

BRIEF DESCRIPTION OF THE FIGURES

Advantageous embodiments of the present invention are explained in further detail below with reference to the drawing, in which.

DETAILED DESCRIPTION OF THE INVENTION

Figure 1:
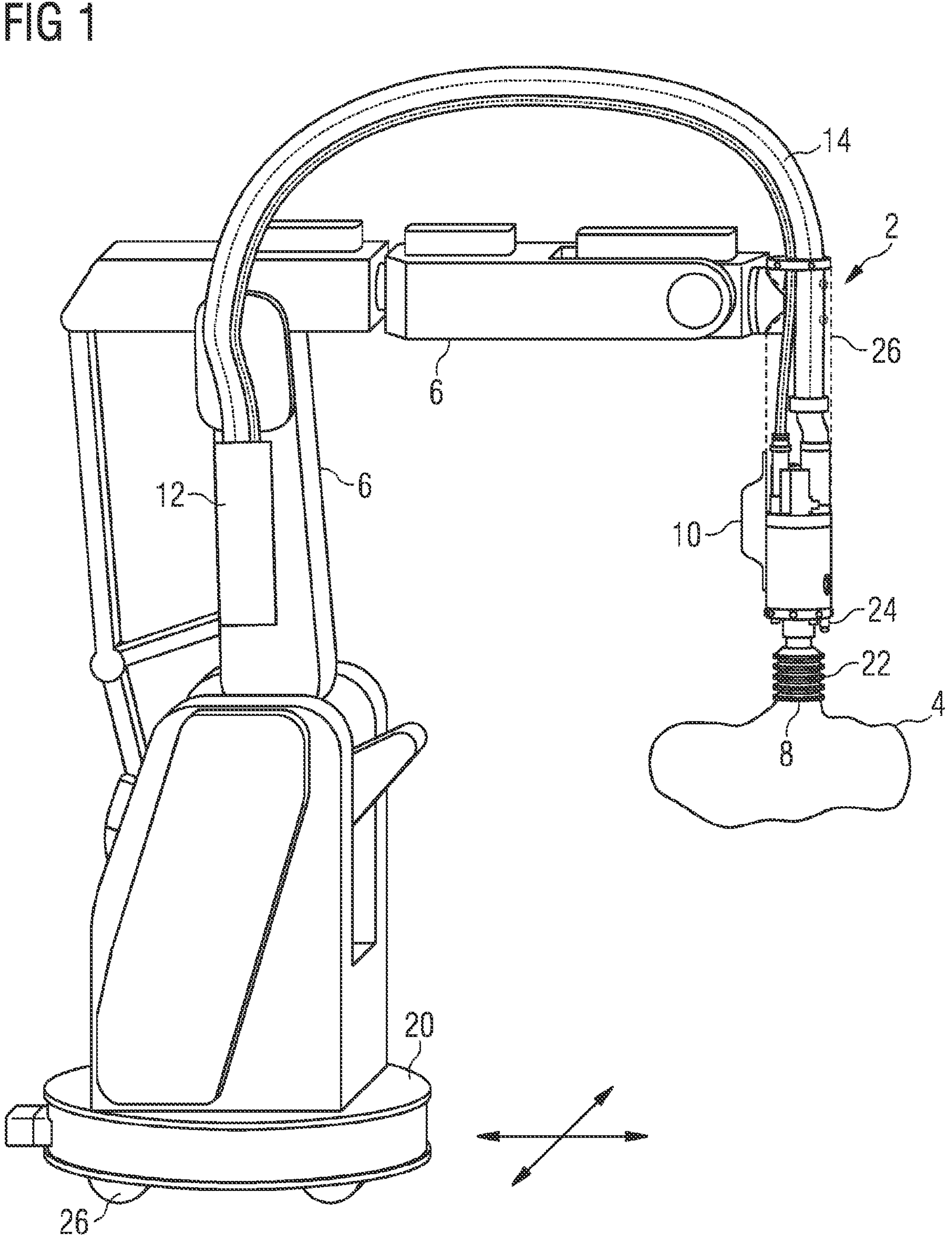
FIG. 1 shows a view of a robot arm with integrated suction apparatus, in a schematic view.

The present invention—as shown in FIG. 1—relates to an apparatus 2 for taking hold of (here securing by way of suction) and releasing an object, here specifically a postal sorting item 4, which may be surrounded by inhomogeneous packaging (i.e., without a stable shape). There is a strong surge in sorting items of this kind in the form of what are known as small item consignments, especially due to the increase in e-commerce. For these kinds of consignment, annual growth rates of more than 20% are predicted for the coming years, whereby on the one hand the number of sorting items to be processed is increasing massively, while on the other hand the packaging of these small item consignments, which very often is not homogeneous, is making the sorting of these sorting items, which are generally referred to as positionally unstable, significantly more challenging compared to a conventional cuboidal package or parcel. In this context, in the sorting process, as a general rule there is the requirement of taking down the sorting item at a first position, for example also from a running conveyor belt, and depositing it at another point, for example also again onto a running conveyor belt or a running sorting trolley.

The present apparatus 2 is now suitable precisely for the processing of these kinds of sorting items, here referred to as "difficult" in the following, which in some circumstances may also have an unstable position and/or be surrounded by packaging without a rigid surface. It is characterized by a simple construction and a rapid process speed and, in this context, makes it possible to move the sorting items 4 reliably from one location to another location.

To this end, for taking hold of and releasing the sorting item 4, the apparatus 2 has a robot arm 6 that can be controlled manually, but also by machine, which can be actively guided to a sorting item. In the case of manual operation (ability for the robot arm 6 to move freely in space within its movement limits) by means of hand grip 10, it is thus possible for an operator (not shown in further detail here) to move a suction opening 8 arranged at the freely movable end of the robot arm 6 for suction of the sorting item 4 toward said sorting item 4 and to approach it to the extent that the sorting item 4 enters the sphere of suction of the suction opening 8 and is thus suctioned at the suction opening 8. In this context, the hand grip 10 may also comprise pressure sensors, which allow the identification of the control of the robot arm 6 with regard to the direction in which the operator wishes to move the robot arm 6. Thus, the robot arm 6 can then be controlled such that it carries out said desired movement. In this context, the entire weight of the robot arm 6 as well as of the sorting item 4 docked at the suction opening 8 can be carried by a movable robot base 20. For the considerations below, however, the exemplary embodiment of an automatically controllable robot arm 6 is chosen, with automatically movable robot base 20 with rollers 26 that can be driven in any direction.

Furthermore, a suction apparatus 12 arranged on the robot arm 6 is provided, which provides the vacuum necessary at the suction opening 8 for taking hold of the sorting item 4 via a first hose 14. Additionally, arranged directly at the suction opening 8 there is a controllable vacuum switching valve 16, which is provided for setting the vacuum from the suction apparatus 12 taking effect on the sorting item. To control the vacuum switching valve 16, a compressed air hose 18 is provided, with which a pilot valve (not shown in further detail here) is controlled with regard to its position, such that the air path from the first hose 14 to the sorting item 4 in the suction opening 8 can be opened in a settable manner with regard to the air cross-section (for example by lifting a valve ball from a sealing ring) and can also be closed off again (for example by lowering the valve ball onto the sealing ring). This compressed air hose 18 is likewise supplied from the suction apparatus 12 and controlled with regard to pressure.

In order to be able to safely hold particularly shapeless, bag-like or otherwise inhomogeneous sorting items at the suction opening 8 after suction, the suction opening 8 is embodied on the side directed toward the sorting item 4 as a suction cup 22 with a rib-like shape. In this context, the ribs of the suction cup 22 are designed, with regard to their deformability, for a bandwidth of anticipated surface inhomogeneities of the sorting items and of course also for a bandwidth of anticipated weights of the sorting items 4. The aim of this design, for example with the provision of large rib widths, consists in being able to achieve a positive fit when contracting the ribs, for example also for bag-like packaging, so that these sorting items can likewise be subjected to comparatively large accelerations and thus can be moved to the desired depositing point in a rapid and efficient manner.

Since e-commerce sorting items, but in principle of course also other sorting items, may also have crumpled, wrinkled, bent and/or porous surfaces, there are certain requirements for the suction apparatus 12 with regard to its suction power. It has to be designed for a bandwidth of anticipated surface inhomogeneities of the sorting items 4 and for the bandwidth of the anticipated weight of the sorting items. Therefore, the suction apparatus 12 must be capable of also being able to compensate comparatively large leakage airflows, so that on balance a sufficient vacuum can be generated in order to be able to secure a sorting item 4 of this kind at the suction opening 8. Accordingly, the vacuum switching valve 16 should then also permit leakage airflows of this kind and likewise also be able to be switched or set in a correspondingly rapid manner.

Furthermore, the vacuum switching valve 16 also comprises sensors for measuring the air throughput and reports these signals to the controller of the suction apparatus 12. In this manner, an adaptive control of the suction power and/or of the setting of the vacuum switching valve 16 can be undertaken, meaning that pressure-sensitive sorting items 4 or bag-like packaging are also not subjected to an excessively strong vacuum.

To control the robot arm 6 and therefore also the suction opening 8 at the next sorting item 4 to be suctioned and then secured, a small camera 24 is provided in the region of the suction opening 8 (for a stereo view, a second camera may be provided on the other side, or even more further cameras). This enables the control of the robot arm 6 to direct the movement of the suction opening 8 toward the sorting item 4 to be suctioned. Once the sorting item 4 has been docked at the suction opening 8, the sorting item can be moved to the intended destination, where it is deposited again, dropped, discarded or otherwise transferred into the further sorting process. To this end, for example, the comparatively small volume between vacuum switching valve 16 and the suctioned sorting item 4, which has been evacuated for the purpose of suctioning and securing the sorting item, can be flooded with air again, meaning that once the vacuum has ceased the sorting item 4 is left to the gravitational force once again.

Figure 2:
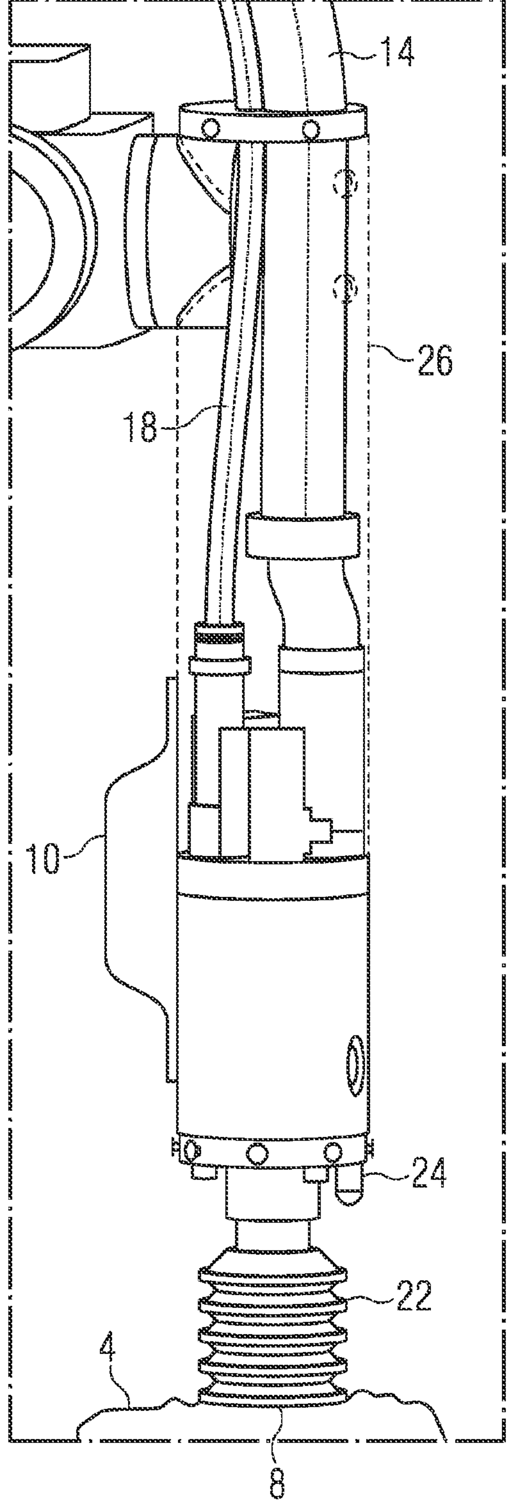
FIG. 2 shows an enlarged section of the robot arm according to FIG. 1, in a schematic view.
Figure 3:
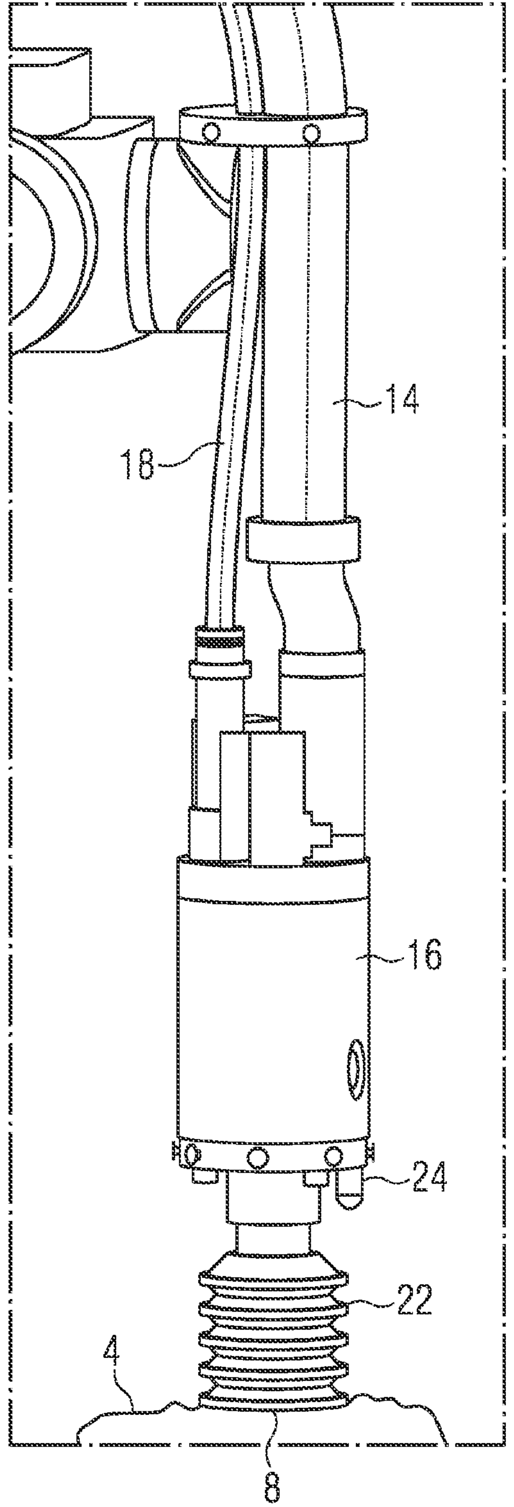
FIG. 3 shows the enlarged section according to FIG. 2 without the casing tube, in a schematic view.

FIGS. 2 and 3 show the robot arm 6 in an enlarged section with a casing tube 26 fastened thereto (FIG. 2), in which the vacuum switching valve 16 is arranged and the two hoses 14, 18 are guided. FIG. 3 shows this section, enlarged in a corresponding manner, but without the casing tube 26.

The exemplary embodiments given here in the preceding can of course also be transferred to any kind of objects which have to be transported in automated manufacturing (in industrial processes in general) from one location (for example a pick stack or from a pick box) to another location (for example depositing on an assembly line or providing to an assembly location). The apparatus disclosed here has the inherent particular advantageous that objects that are difficult to grasp can be rapidly docked and safely held at the suction opening 8 and can be rapidly released again at the destination.

The invention claimed is:

1. An apparatus for taking hold of and releasing an object, the apparatus comprising:
- an arm configured to be actively guided to the object, under at least one of manual control or machine control;
- a suction opening arranged at a freely movable end of said arm for attaching the object by suction;
- a suction apparatus communicating with said suction opening for providing a vacuum at said suction opening for taking hold of the object; and
- a controllable vacuum switching valve disposed at said suction opening for adjusting the vacuum from the suction apparatus acting on the object.

2. The apparatus according to claim 1, wherein the apparatus is configured to selectively take hold of objects that are at least one of positionally unstable and are encased in packaging without a rigid surface.

3. The apparatus according to claim 1, wherein said suction opening is embodied in a suction cup with a rib-shape on a side facing the object.

4. The apparatus according to claim 3, wherein said suction cup is formed with ribs that are configured, with regard to a deformability thereof, for at least one of a bandwidth of anticipated surface inhomogeneities of the object or a bandwidth of anticipated weights of the object.

5. The apparatus according to claim 1, wherein said suction apparatus is configured, with regard to a suction power thereof, for at least one of a bandwidth of anticipated surface inhomogeneities of the object or a bandwidth of anticipated weights of the object.

6. The apparatus according to claim 1, wherein said suction apparatus is arranged immediately at said suction opening.

7. The apparatus according to claim 6, wherein said suction apparatus is carried by said arm.

8. An apparatus for taking hold of and releasing an object, the apparatus comprising:
- an arm configured to be actively guided to the object, under at least one of manual control or machine control, wherein said arm comprises a robot arm;
- a suction opening arranged at a freely movable end of said arm for attaching the object by suction;
- a suction apparatus communicating with said suction opening for providing a vacuum at said suction opening for taking hold of the object;
- a controllable vacuum switching valve disposed at said suction opening for adjusting the vacuum from the suction apparatus acting on the object; and
- optical detectors for enabling a control of said robot arm and said suction opening towards the object and, selectively, for transporting the object.

9. An apparatus for taking hold of and releasing an object, the apparatus comprising:
- an arm configured to be actively guided to the object, under at least one of manual control or machine control;

a suction opening arranged at a freely movable end of said arm for attaching the object by suction;

a suction apparatus communicating with said suction opening for providing a vacuum at said suction opening for taking hold of the object;

a controllable vacuum switching valve disposed at said suction opening for adjusting the vacuum from the suction apparatus acting on the object; and a compressed air hose configured to control the position of a pilot valve where the pilot valve is adjustable to control an air cross-section of the suction opening.

10. The apparatus according to claim 9, wherein the apparatus is configured to selectively take hold of objects that are at least one of positionally unstable and are encased in packaging without a rigid surface.

11. The apparatus according to claim 9, wherein said suction opening is embodied in a suction cup with a rib-shape on a side facing the object.

12. The apparatus according to claim 11, wherein said suction cup is formed with ribs that are configured, with regard to a deformability thereof, for at least one of a bandwidth of anticipated surface inhomogeneities of the object or a bandwidth of anticipated weights of the object.

13. The apparatus according to claim 9, wherein said suction apparatus is configured, with regard to a suction power thereof, for at least one of a bandwidth of anticipated surface inhomogeneities of the object or a bandwidth of anticipated weights of the object.

14. The apparatus according to claim 9, wherein said suction apparatus is arranged immediately at said suction opening.

15. The apparatus according to claim 14, wherein said suction apparatus is carried by said arm.

16. The apparatus according to claim 9, wherein said arm is a robot arm.

17. The apparatus according to claim 16, further comprising optical detectors for enabling a control of said robot arm and said suction opening towards the object and, selectively, for transporting the object.

* * * * *